United States Patent
Jiang et al.

(10) Patent No.: US 9,069,054 B2
(45) Date of Patent: Jun. 30, 2015

(54) MICROWAVE TRANSMISSION APPARATUS

(71) Applicant: Huawei Technologies Co., Ltd., Shenzhen, Guangdong (CN)

(72) Inventors: Bing Jiang, Chengdu (CN); Yihua Zhang, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 337 days.

(21) Appl. No.: 13/757,259

(22) Filed: Feb. 1, 2013

(65) Prior Publication Data

US 2013/0141272 A1 Jun. 6, 2013

Related U.S. Application Data

(63) Continuation of application No. PCT/CN2011/073691, filed on May 5, 2011.

(30) Foreign Application Priority Data

Aug. 31, 2010 (CN) .......................... 2010 1 0268000

(51) Int. Cl.
*G01S 13/00* (2006.01)
*H04J 3/16* (2006.01)
(Continued)

(52) U.S. Cl.
CPC ................. *G01S 1/024* (2013.01); *G01S 7/003* (2013.01); *H04J 3/0617* (2013.01); *G01S 7/03* (2013.01);
(Continued)

(58) Field of Classification Search
CPC .......... H04B 1/04; H04B 1/7073; H04B 3/46; H04B 7/0452; H04B 7/06; H04B 7/0697; H04B 10/07; H04B 10/50; H04B 10/516; G01S 7/00; G01S 7/003; G01S 7/03; H04J 1/02; H04J 3/02; H04J 3/06; H04J 3/0617; H04J 3/0635; H04J 3/0685; H04J 3/0688

USPC ......... 370/229, 232, 252, 503, 538, 540, 545; 342/175, 200
See application file for complete search history.

(56) References Cited

U.S. PATENT DOCUMENTS 4,440,501 A * 4/1984 Schulz ............................ 368/47
4,558,317 A * 12/1985 Armstrong ..................... 370/228
(Continued)

FOREIGN PATENT DOCUMENTS

| CN | 101035323 A | 9/2007 |
| CN | 101588489 A | 11/2009 |

(Continued)

OTHER PUBLICATIONS

Supplementary European Search Report dated Jun. 5, 2012 in connection with European Patent Application No. EP 11 82 1020.

(Continued)

*Primary Examiner* — Peter Bythrow

(57) ABSTRACT

A microwave transmission apparatus is provided. A multiplexing unit generates multiplexed data based on a service clock rate. An interface unit writes and reads the multiplexed data at the service clock rate and a read clock rate respectively. An encoding and mapping unit performs encoding and mapping on the multiplexed data using a symbol clock rate to generate symbol data, and sends the symbol data to up conversion units. A clock tracking unit generates the symbol clock according to the system clock, and performs frequency division on the symbol clock to acquire the read clock. A stream control unit adjusts the service clock rate according to a water line error generated by the interface unit, so that the service clock rate is equal to the read clock rate. As a frequency and a phase of the system clock are fixed, even ACM switching occurs, the system clock is stably transferred.

3 Claims, 2 Drawing Sheets

(51) Int. Cl.
  *G01S 1/02* (2010.01)
  *H04B 1/04* (2006.01)
  *H04B 1/74* (2006.01)
  *G01S 7/00* (2006.01)
  *H04J 3/06* (2006.01)
  *G01S 7/03* (2006.01)
  *H04J 1/02* (2006.01)
  *H04J 3/02* (2006.01)

(52) U.S. Cl.
  CPC  *H04J 3/0685* (2013.01); *H04J 1/02* (2013.01); *H04J 3/0635* (2013.01); *H04J 3/0688* (2013.01); *G01S 7/00* (2013.01); *H04J 3/02* (2013.01); *H04J 3/06* (2013.01); *H04B 1/04* (2013.01); *H04B 1/74* (2013.01)

(56) References Cited

U.S. PATENT DOCUMENTS

| | | | | |
|---|---|---|---|---|
| 4,589,108 A * | 5/1986 | Billy | | 370/503 |
| 4,961,188 A * | 10/1990 | Lau | | 370/517 |
| 4,987,568 A * | 1/1991 | Shinada et al. | | 370/249 |
| 5,204,882 A * | 4/1993 | Chao et al. | | 375/354 |
| 5,369,635 A * | 11/1994 | Gandini et al. | | 370/389 |
| 5,548,580 A * | 8/1996 | Buckland | | 370/253 |
| 5,844,891 A * | 12/1998 | Cox | | 370/395.62 |
| 5,923,755 A * | 7/1999 | Birch | | 380/212 |
| 6,157,659 A * | 12/2000 | Bird | | 370/538 |
| 6,201,793 B1 * | 3/2001 | Chen et al. | | 370/238 |
| 6,512,755 B1 | 1/2003 | Deschaine et al. | | |
| 6,754,745 B1 * | 6/2004 | Horvath et al. | | 710/58 |
| 7,472,199 B1 * | 12/2008 | Rutherford et al. | | 709/233 |
| 8,462,816 B2 * | 6/2013 | Yin | | 370/474 |
| 2001/0053161 A1 * | 12/2001 | Tomizawa et al. | | 370/538 |
| 2006/0104309 A1 | 5/2006 | Vissers et al. | | |
| 2007/0036180 A1 * | 2/2007 | Shenoi | | 370/516 |
| 2009/0086767 A1 * | 4/2009 | Li | | 370/542 |
| 2010/0067552 A1 * | 3/2010 | Sun et al. | | 370/498 |
| 2010/0221005 A1 * | 9/2010 | Zhao | | 398/52 |
| 2011/0182175 A1 * | 7/2011 | Zhang | | 370/229 |
| 2012/0207472 A1 * | 8/2012 | Song et al. | | 398/58 |
| 2013/0044626 A1 * | 2/2013 | Smidth | | 370/252 |

FOREIGN PATENT DOCUMENTS

| | | |
|---|---|---|
| CN | 101753203 A | 6/2010 |
| CN | 101951304 A | 1/2011 |
| EP | 2 461 489 A1 | 6/2012 |
| GB | 2 098 029 A | 11/1982 |
| JP | 11027330 A | 1/1999 |
| RU | 2303331 C1 | 7/2007 |
| WO | WO 2005/039148 A1 | 4/2005 |
| WO | WO 2009/075537 A2 | 6/2009 |

OTHER PUBLICATIONS

Office Action dated Aug. 17, 2011 in connection with Chinese Patent Application No. 201010268000.1.
International Search Report dated Aug. 11, 2011 in connection with International Patent Application No. PCT/CN2011/073691, 4 pages.

* cited by examiner

MICROWAVE TRANSMISSION APPARATUS

CROSS-REFERENCE TO RELATED APPLICATIONS

This application is a continuation of International Application No. PCT/CN2011/073691, filed on May 5, 2011, which claims priority to Chinese Patent Application No. 201010268000.1, filed on Aug. 31, 2010, both of which are hereby incorporated by reference in their entireties.

TECHNICAL FIELD

The present invention relates to the field of microwave transmission, and in particular, to a microwave transmission apparatus in which adaptive code and modulation (adaptive code and modulation, ACM) is applied.

BACKGROUND

As shown in FIG. 1, a microwave transmission apparatus 100 includes a service transmitting device 102 and a service transmitting device 104 which both have a same function. The service transmitting devices 102 and 104 respectively play a primary role and a secondary role. The service transmitting device 102 includes a convergence module 12, an intermediate frequency module 14, a radio frequency module 16, and an ACM engine 18. The service transmitting device 104 includes a convergence module 13, an intermediate frequency module 15, a radio frequency module 17, and an ACM engine 19. The convergence module 12 converges received services to generate multiplexed data and transmitting, at a service clock rate, the multiplexed data to the intermediate frequency module 14 and the intermediate frequency module 15 respectively. The intermediate frequency module 14 and the intermediate frequency module 15 respectively process the multiplexed data, and then perform transmission respectively through the radio frequency module 16 and through the radio frequency module 17, so as to support a 1+1 protection switching function.

In a microwave transmission apparatus 100 in which the ACM is applied, as a transmission capacity changes at any time along with changes of ambient factors such as the weather, to ensure the transmission quality and maintain a high bandwidth utilization ratio, the convergence module 12 is required to correspondingly change a service clock rate for transferring the multiplexed data. Accordingly, the ACM engine 18 is required to change parameters, such as a service modulation mode and an encoding rate, and initiate ACM switching.

During the ACM switching, the service clock rate at which the convergence module 12 sends the multiplexed data changes in different modulation modes, and correspondingly, a rate and a phase of a symbol clock generated by the intermediate frequency modules 14 and 15 in tracking the service clock rate also change, so a system clock generated by a receiver in tracking the symbol clock is unstable, so that the error rate of the service during the transmission is increased.

SUMMARY

An embodiment of the present invention provides a microwave transmission apparatus, so that a stable system clock can be transferred between microwave transmission apparatuses.

A microwave transmission apparatus includes a first service transmitting device and a second service transmitting device which have a same function. The first service transmitting device includes a first multiplexing unit, a first stream control unit, a first interface unit, a first encoding and mapping unit, a first up conversion unit, and a first clock tracking unit. The second service transmitting device includes a second up conversion unit.

The first multiplexing unit sends, through the stream control unit according to a service clock rate, multiplexed data generated by the first multiplexing unit to the interface unit.

The first interface unit writes the multiplexed data at the service clock rate, and reads the multiplexed data at a read clock rate, and transfers the multiplexed data to the encoding and mapping unit.

The first encoding and mapping unit performs, by using a symbol clock rate, encoding and mapping on the multiplexed data to generate symbol data, and sends the symbol data to the first up conversion unit and the second up conversion unit.

The clock tracking unit generates the symbol clock according to a system clock, and perform frequency division on the symbol clock to acquire the read clock.

The stream control unit adjusts the service clock rate according to a water line error generated by an interface unit, so that the service clock rate is equal to the read clock rate.

In the embodiment of the present invention, as a frequency and a phase of the system clock of the microwave transmission apparatus are fixed, even when ACM switching occurs, a frequency and a phase of the symbol clock generated by the clock tracking unit according to the system clock are still fixed, so that a receiver can generate a stable system clock by tracking the symbol clock, so as to stably transfer the system clock between microwave transmission apparatuses.

BRIEF DESCRIPTION OF THE DRAWINGS

The following accompanying drawings are used for understanding of the embodiments of the present invention and do not serve as limitations on the present invention.

DETAILED DESCRIPTION

For persons of ordinary skill in the art to understand and implement the present invention, the embodiments of the present invention are described with reference to the accompanying drawings. Here, the exemplary embodiments of the present invention and the illustration thereof are used for explaining the present invention but do not serve as limitations on the present invention.

Figure 1:
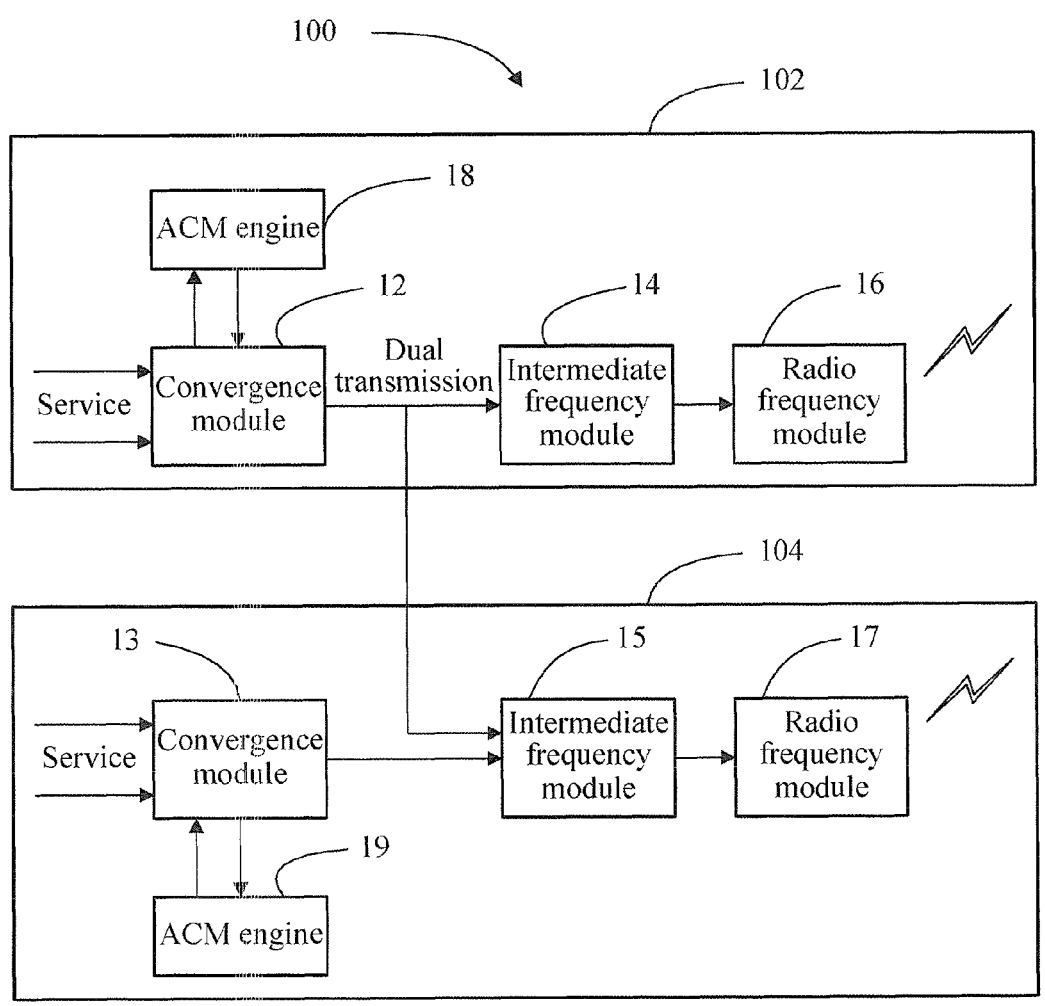
FIG. 1 is a schematic diagram of a functional structure of a microwave transmission apparatus in the prior art.
Figure 2:
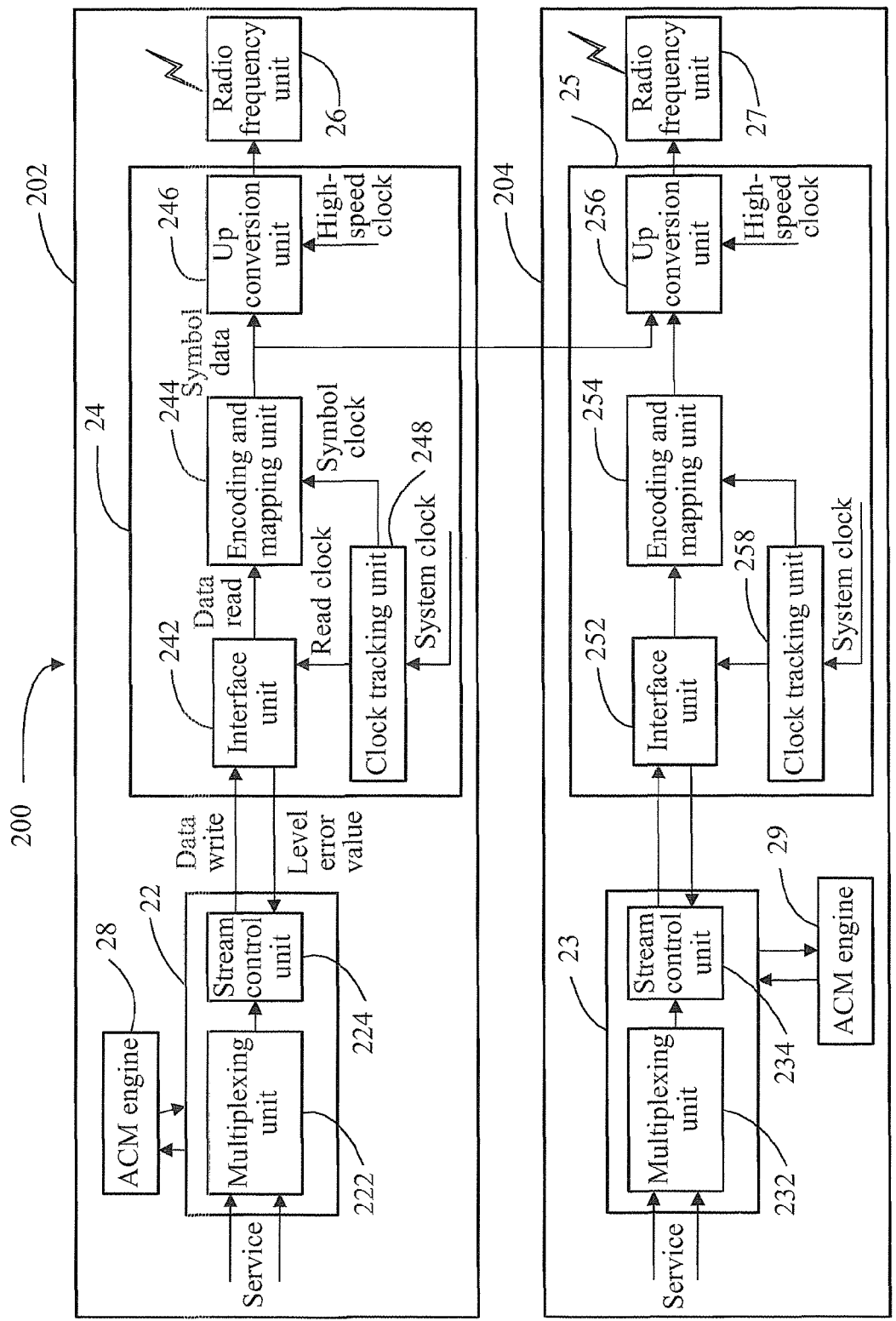
FIG. 2 is a schematic diagram of function modules of a microwave transmission apparatus according to an embodiment of the present invention.

FIG. 2 is a schematic diagram of function modules of a microwave transmission apparatus 200 according to an embodiment of the present invention. The microwave transmission apparatus 200 includes a service transmitting device 202 and a service transmitting device 204 which have a same function. The service transmitting devices 102 and 104 play respectively a primary role and a secondary role. The service transmitting device 102 includes a convergence module 22, an intermediate frequency module 24, a radio frequency module 26, and an ACM engine 28. The service transmitting device 204 includes a convergence module 23, an intermediate frequency module 25, a radio frequency module 27, and an ACM engine 29.

The convergence module 22 includes a multiplexing unit 222 and a stream control unit 224. The intermediate frequency module 24 includes an interface unit 242, an encoding and mapping unit 244, an up conversion unit 246, and a clock tracking unit 248. The convergence module 23 includes a multiplexing unit 232 and a stream control unit 234. The intermediate frequency module 25 includes an interface unit 252, an encoding and mapping unit 254, an up conversion unit 256, and a clock tracking unit 258.

As the corresponding functional units in the service transmitting devices 102 and 104 execute same functions, based on the principle of simplicity, in this embodiment, only the service transmitting device 102 is introduced in detail.

The multiplexing unit 222 multiplexes received services to generate multiplexed data and sends, at a service clock rate, the multiplexed data to the interface unit 242 through the stream control unit 224. The service includes a time division multiplex (time division multiplex, TDM) service and an Ethernet (Ethernet) service.

The interface unit 242 writes the multiplexed data at the service clock rate, and reads the multiplexed data at a read clock rate, and transfers the multiplexed data to the encoding and mapping unit 244. When the clock rates for reading and writing the multiplexed data are unequal, the interface unit 242 generates a water line error and sends the water line error to the stream control unit 224. For example, the interface unit 242 may be a first in first out (First in First out, FIFO) memory. When the FIFO memory writes the multiplexed data for the first time, as a read operation is not started yet, the interface unit 242 generates the water line error.

The stream control unit 224 adjusts the service clock rate according to the water line error, so that the clock rates at which the interface unit 242 reads and writes the multiplexed data are equal. For example, when the level rises, the stream control unit 224 decreases the service clock rate for sending the multiplexed data. When the level drops, the stream control unit 224 increases the service clock rate for sending the multiplexed data.

The clock tracking unit 248 generates a symbol clock according to the system clock of the microwave transmission apparatus 200, and performs, by using a frequency division factor M/N, frequency division on the symbol clock to acquire the read clock, that is, the M/N of the symbol clock is used as the read clock. The clock tracking unit 248 also provides the symbol clock for the encoding and mapping unit 244 and provides the read clock for the interface unit 242. For example, the clock tracking unit 248 includes a frequency synthesizer and a frequency divider. The frequency synthesizer generates the symbol clock according to the system clock of the microwave transmission apparatus 200. The frequency divider performs, by using the frequency division factor M/N, frequency division on the symbol clock to acquire the read clock.

The encoding and mapping unit 244 performs, by using the symbol clock, encoding and mapping on the multiplexed data to generate I and Q symbol data, and sends the symbol data to the up conversion units 246 and 256.

The up conversion units 246 and 256 perform, by using high-speed clocks, interpolation on the symbol data to generate number symbol streams, and implements interpolation conversion from the symbol clock to a sampling clock domain.

The radio frequency units 26 and 27 respectively convert the number symbol streams generated by the up conversion units 246 and 256 into analog signals, and modulate the analog signals into radio frequency signals and perform transmission, so as to support a 1+1 protection switching function.

The receiver receives and selects the multiplexed data, tracks the symbol clock carried in the multiplexed data to generate a system clock for use by the receiver, so as to finish the transfer of the system clock between the microwave transmission apparatuses 200.

As a frequency and a phase of a system clock of the microwave transmission apparatus 200 are fixed, even when ACM switching occurs, a frequency and a phase of the symbol clock generated by the clock tracking unit 248 according to the system clock are still fixed, so that the receiver can still generate a stable system clock by tracking the symbol clock, which enables transfer of a stable system clock between the microwave transmission apparatuses 200 and then reduces a bit error rate in the service transmission between the microwave transmission apparatuses 200.

In addition, the encoding and mapping unit 244 sends the symbol data generated after the encoding and mapping of the multiplexed data to the up conversion units 246 and 256, so as to avoid the result caused by the multiplexing unit 322 directly sending the multiplexed data to the interface units 242 and 252: as it is impossible to keep the levels of the interface units 242 and 252 completely the same, the interface units 242 and 252 respectively send two different water line errors to the stream control unit 224, which causes that the stream control unit 224 does not know which water line error should be used to adjust the service clock rate for sending the multiplexed data, and thereby causes control disturbance.

Further, the up conversion units 246 and 256 respectively use independent high-speed clocks as interpolation clocks, and the two high-speed clocks are not required to be synchronous, which avoids the hardware cost and complexity resulted from synchronization of primary and secondary high-speed clocks.

It should be noted that during a normal working process, the ACM engine 29, the multiplexing unit 232, the stream control unit 234, the interface unit 252, and the encoding and mapping unit 254 in the service transmitting device 204 do not work, and are triggered to work only when the primary and secondary roles of the service transmitting devices 202 and 204 are switched, so that the power consumption can be reduced.

The above descriptions are merely exemplary implementation manners of the present invention, but the present invention is not limited thereto. Any modification or replacement that can be easily figured out by any person skilled in the art within the technical scope disclosed in the present invention shall fall within the protection scope of the present invention. Therefore, the protection scope of the present invention shall be subjected to the protection scope of the claims.

What is claimed is:

1. A microwave transmission apparatus, comprising:
a first service transmitting device and a second service transmitting device which have a same function;
wherein the first service transmitting device comprises a first multiplexing unit, a first stream control unit, a first interface unit, a first encoding and mapping unit, a first up conversion unit, and a first clock tracking unit;
the second service transmitting device comprises a second up conversion unit;
the first multiplexing unit sends, through the first stream control unit at a service clock rate, multiplexed data generated by the first multiplexing unit to the first interface unit;
the first interface unit writes the multiplexed data at the service clock rate, and reads the multiplexed data at a read clock rate, and transfers the multiplexed data to the first encoding and mapping unit;
the first encoding and mapping unit performs, by using a symbol clock rate, encoding and mapping on the multiplexed data to generate symbol data and sends the symbol data to the first up conversion unit and the second up conversion unit;

the first clock tracking unit generates the symbol clock according to a system clock, and performs frequency division on the symbol clock to acquire the read clock; and the stream control unit adjusts the service clock rate according to a water line error generated by the first interface unit, so that the service clock rate is equal to the read clock rate.

2. The microwave transmission apparatus according to claim 1, wherein the first up conversion unit and the second up conversion unit perform, by using respective independent high-speed clocks, interpolation on the symbol data to generate number symbol streams.

3. The microwave transmission apparatus according to claim 1, wherein when the service clock rate is inconsistent with the read clock rate, the interface unit generates the water line error.

* * * * *